(12) United States Patent
Kikuchi

(10) Patent No.: US 7,809,261 B2
(45) Date of Patent: Oct. 5, 2010

(54) IMAGE SENSING APPARATUS AND CONTROL METHOD

(75) Inventor: Hiroshi Kikuchi, Zushi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/758,406

(22) Filed: Apr. 12, 2010

(65) Prior Publication Data

US 2010/0195999 A1   Aug. 5, 2010

Related U.S. Application Data

(63) Continuation of application No. 12/118,840, filed on May 12, 2008, now Pat. No. 7,729,609.

(30) Foreign Application Priority Data

May 23, 2007   (JP)   ............................. 2007-137016

(51) Int. Cl.
 G03B 13/02   (2006.01)
 G03B 9/02    (2006.01)
 H04N 5/222   (2006.01)
(52) U.S. Cl. .................. 396/374; 396/509; 396/257; 348/333.01; 348/333.11; 348/333.09

(58) Field of Classification Search .................. 396/374
 See application file for complete search history.

(56) References Cited

U.S. PATENT DOCUMENTS

2008/0266439 A1*  10/2008  Okazaki ................ 348/333.01

* cited by examiner

*Primary Examiner*—W. B. Perkey
*Assistant Examiner*—Bret Adams
(74) *Attorney, Agent, or Firm*—Cowan, Liebowitz & Latman, P.C.

(57) ABSTRACT

An image sensing apparatus to which a detachable lens unit (102) is attached, is provided with an image sensor (106) that converts light beams entering through the attached lens unit into electrical signals, and a display unit (107), including an electronic viewfinder mode to continuously display on the display unit images based on the electrical signals obtained by the image sensor. The image sensing apparatus has a control unit (135) that causes an aperture unit (104) included in the attached lens unit to stop down, when there is an instruction to display on the display unit an image other than the image based on the electrical signals obtained by the image sensor while in the electronic viewfinder mode.

8 Claims, 8 Drawing Sheets

IMAGE SENSING APPARATUS AND CONTROL METHOD

CROSS-REFERENCE TO RELATED APPLICATION

This application is a continuation of application Ser. No. 12/118,840, filed May 12, 2008 now U.S. Pat. No. 7,729,609, the entire disclosure of which is hereby incorporated by reference.

BACKGROUND OF THE INVENTION

1. Field of the Invention

The present invention relates to an image sensing apparatus and a control method for the image sensing apparatus, and more particularly, to an image sensing apparatus with an electronic viewfinder function.

2. Description of the Related Art

In a single-lens reflex camera that is one type of image sensing apparatus, when observing an object using an optical viewfinder (OVF), light beams exiting from a photographing lens are reflected by a mirror provided on an image plane side of the photographing lens and directed to an optical viewfinder that includes a pentaprism or the like. Such an arrangement enables a photographer to see an image of an object formed by the photographing lens as a normal image. At this time, the mirror is set obliquely in the photographic optical path. To photograph an image of an object from this state, the mirror is momentarily withdrawn from the photographic optical path to allow the light beams from the photographing lens to reach an image sensor. Then, when photography is finished, the mirror is immediately returned to its original position in the photographic optical path.

By contrast, as another method of observing an image of an object there is an electronic viewfinder (EVF), which reads out a reduced resolution image signal of the image of the object from the image sensor and displays the read-out image signal on a display unit such as an LCD mounted on a rear side of the camera, at a high display rate and in real time. In this case, the mirror is withdrawn from the photographic optical path and the shutter is kept open so as to direct light beams exiting from the photographing lens to the image sensor without blocking the light beams (see, for example, Japanese Patent Application Laid-Open No. 2006-33705).

The display unit provided on the rear surface of the camera is usually configured so as to be able to carry out displays suitable for multiple purposes, such as displays of information set in the camera, menus to change the set functional contents, photographed images, and the like. In addition, switching of the display on the display unit is user selectable. When an image other than the image of the object (such as a menu screen) is selected while in the EVF mode for viewing the object with the electronic viewfinder, the display is immediately switched from a screen showing the image of the object to the menu screen.

When the menu screen is displayed in the EVF mode, as described above the camera withdraws the mirror from the photographic optical path and keeps the shutter open so that the light beams exiting from the photographing lens can be directed to the image sensor without being blocked. However, because the menu screen is being displayed, the user cannot see the image of the object that is entering the image sensor. As a result, for example, if the photographing lens is inadvertently pointed toward the sun, sunlight is then focused on the image sensor, possibly causing a portion of the image sensor to heat up and burn out.

If the mirror is moved every time there is a switch to the menu screen, the sound of the mirror moving, and especially the sound of impact as the mirror descends into place, not only is noisy but can also mislead the user into thinking that the shutter release button has been pressed. In addition, when returning from display of the menu screen to the EVF display screen to once again display an image of the object, because the mirror has to be driven it takes longer to return to the screen showing the image of the object, which is inconvenient.

SUMMARY OF THE INVENTION

The present invention has been made in consideration of the above situation, and has as its object to protect the image sensor and at the same time to enable return to a screen showing an image of an object more quickly when displaying an image other than an image of an object in an electronic viewfinder mode.

According to one aspect of the present invention, there is provided an image sensing apparatus having:

aperture means;

an image sensor adapted to convert light entering through a photographing lens and the aperture means into electrical signals; and display means, the image sensing apparatus having an electronic viewfinder mode in which an image based on electrical signals obtained by the image sensor is displayed continuously on the display means, characterized in that the image sensing apparatus further comprises: control means operable to cause the aperture means to stop down if there is an instruction to display an image other than an image based on electrical signals obtained by the image sensor on the display means while in the electronic viewfinder mode.

According to another aspect of the present invention, there is provided a control method for an image sensing apparatus that includes aperture means, an image sensor that converts light entering through a photographing lens and the aperture means into electrical signals, and display means, and that is operable in an electronic viewfinder mode in which an image based on electrical signals obtained by the image sensor is displayed continuously on the display means, the control method being characterized by comprising:

stopping down the aperture means if there is an instruction to display on the display means an image other than an image based on electrical signals obtained by the image sensor while in the electronic viewfinder mode.

Further features of the present invention will become apparent from the following description of exemplary embodiments (with reference to the attached drawings).

DESCRIPTION OF THE EMBODIMENTS

A preferred embodiment of the present invention will be described in detail in accordance with the accompanying drawings. The dimensions, shapes and relative positions of the constituent parts shown in the embodiment should be changed as convenient depending on various conditions and on the structure of the apparatus adapted to the invention, and the invention is not limited to the embodiments described herein.

Figure 1:
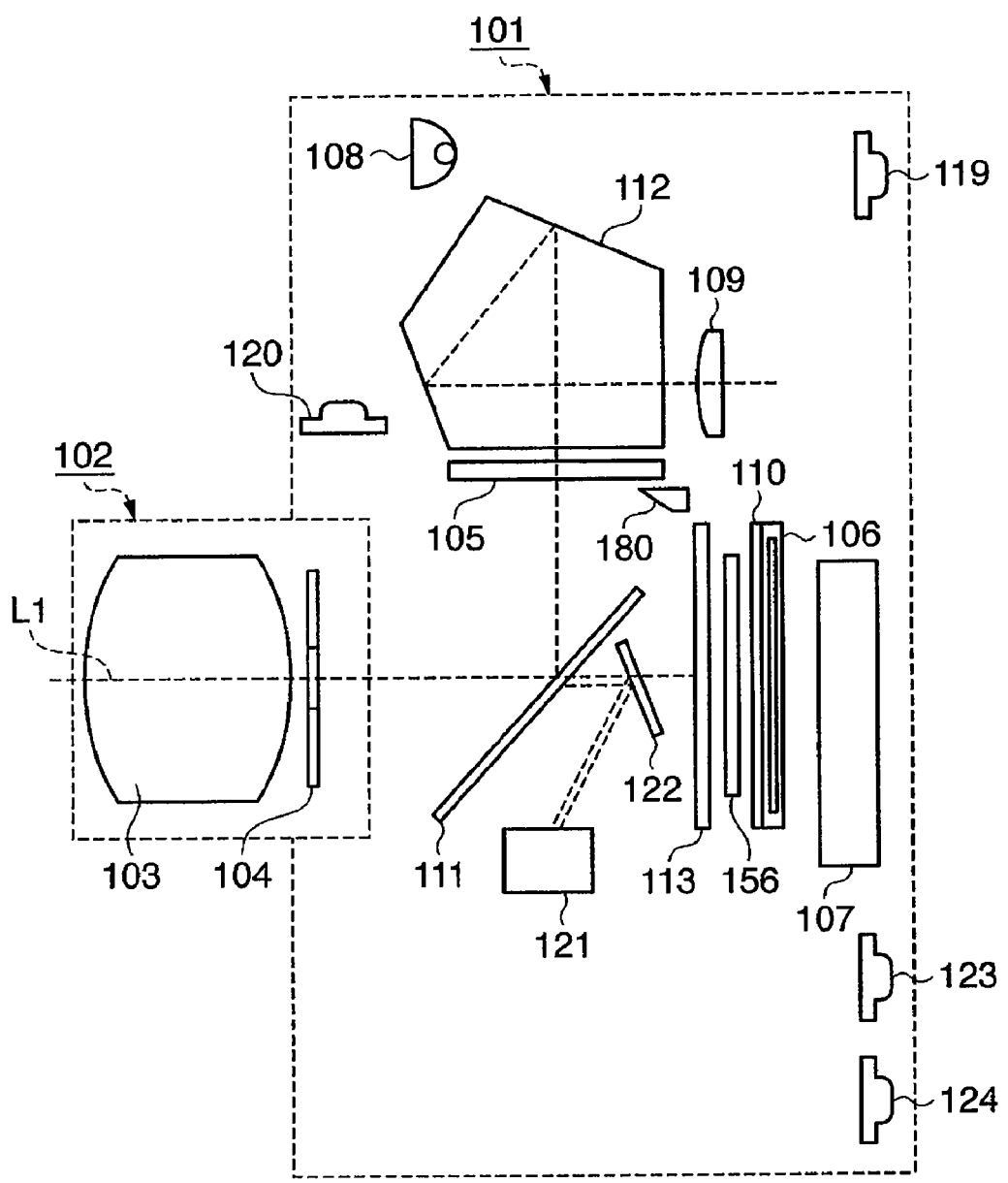
FIG. 1 is a lateral central longitudinal sectional view of a general configuration of an image sensing apparatus according to an embodiment of the present invention, showing viewing of an object with an optical viewfinder (OVF)
Figure 2:
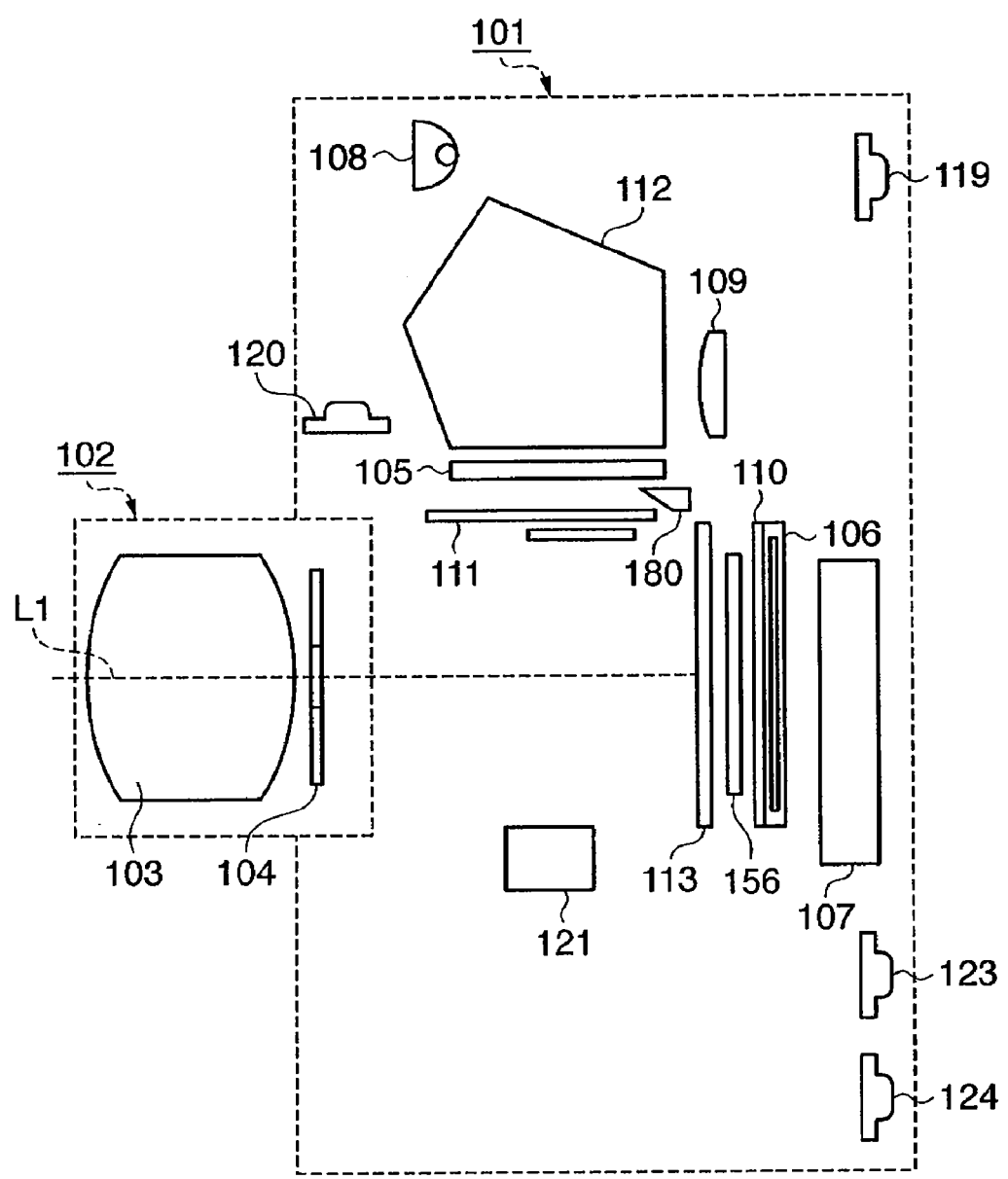
FIG. 2 is a lateral central longitudinal sectional view showing viewing of an object with an electronic viewfinder (EVF) in the image sensing apparatus shown in FIG. 1.
Figure 3:
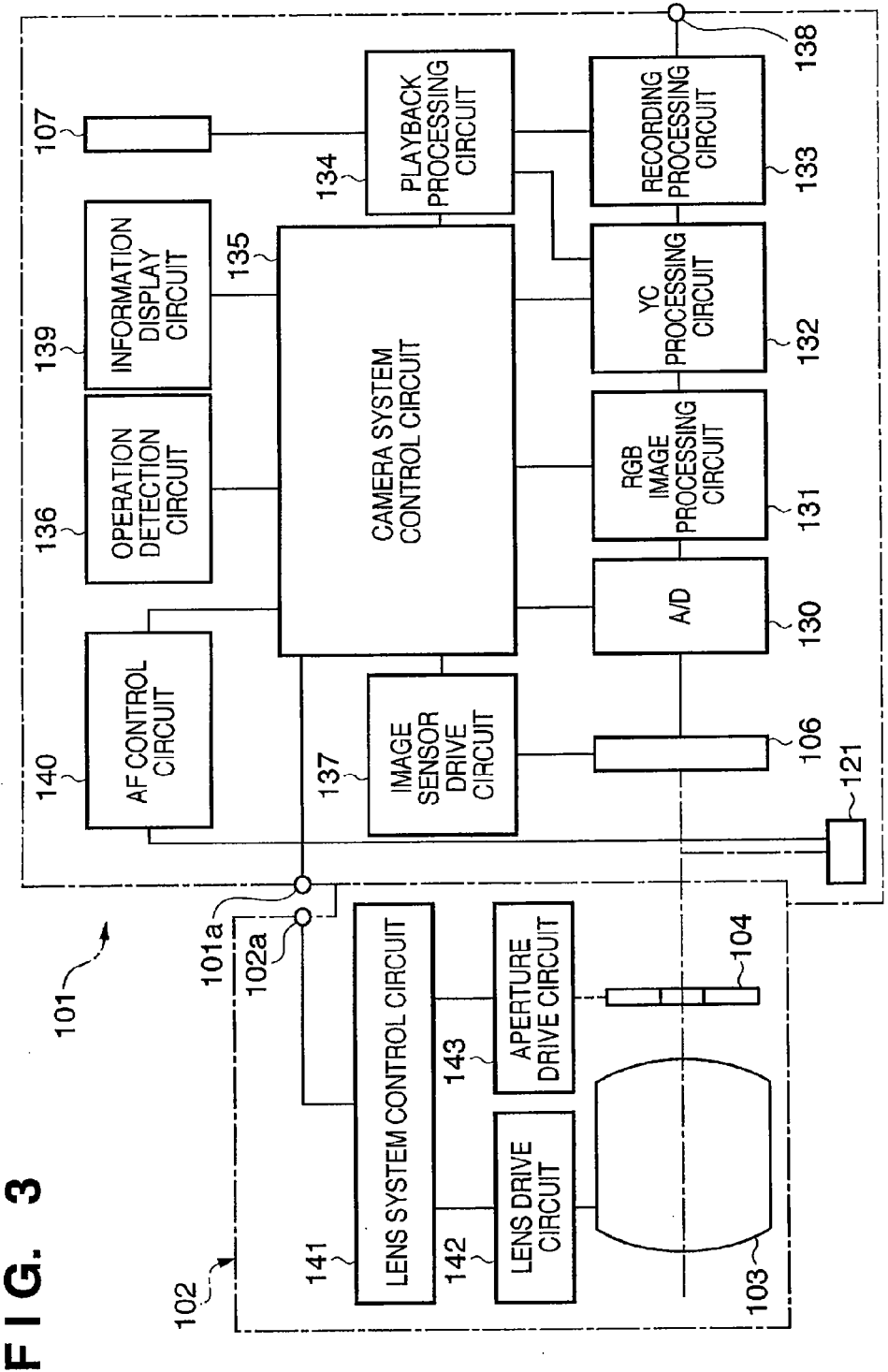
FIG. 3 is a block diagram showing the general functional configuration of the image sensing apparatus shown in FIG. 1 and FIG. 2.

A description is now given of the configuration of a single-lens reflex digital camera as one example of an image sensing system according to an embodiment of the present invention, while referring to FIG. 1 through FIG. 3.

FIG. 1 and FIG. 2 are schematic cross-sectional views showing the configuration of a camera system of the present embodiment, including a camera body 101 and a lens device 102 that is removably attached to the camera body 101. FIG. 1 shows the camera system when observing an object with an optical viewfinder (OVF). The state shown in FIG. 1 is hereinafter called an optical viewfinder mode (OVF mode). FIG. 2 shows the camera system when making an object viewable using an electronic viewfinder (EVF) function that continuously shows an image of the object on a display unit 107 mounted on a rear surface of the camera body 101. The state shown in FIG. 2 is hereinafter called an electronic viewfinder mode (EVF mode).

Inside the lens device 102 is a photographing optical system 103 and an aperture 104 for controlling an exposure light amount. The lens device 102 is electrically and mechanically connected to the camera body 101 via a known mount mechanism. By attaching lens devices 102 of different focal lengths to the camera body 101 it is possible to obtain photographic fields of a variety of different angles of view. In addition, the lens device 102 controls the focus of the photographing optical system 103 by moving a focus lens that is one element of the photographing optical system 103 through a drive mechanism that is not shown.

The camera body 101 is a single-plane type digital color camera that uses a single image sensor 106 such as a CCD sensor or a CMOS sensor, which drives the image sensor 106 continuously or intermittently and obtains image signals representing moving images or still images. It should be noted that the image sensor is an area sensor, which converts the light of exposure into an electrical charge at each pixel, accumulates the electrical charge according to the amount of light received, and outputs the accumulated electrical charges. The image sensor 106 is contained in a package 110. In addition, an optical low-pass filter 156 that restricts a cut-off frequency of the photographing optical system 103 so that spatial frequency components of the image of the object (the optical image) higher than that necessary for the image sensor 106 are not transmitted thereto is provided in an optical path extending from the photographing optical system 103 to the image sensor 106.

An image sensor having a total of 10 million square pixels, for example, may be used as the image sensor 106. R (red), G (green), and B (blue) color filters are alternately arranged on the pixels so that four pixels form one set, in a so-called Bayer pattern. In a Bayer pattern, there are many more of the green pixels that the human eye resolves more clearly when observing an image than red or blue pixels, thus enhancing overall imaging performance. In general, in image processing that uses this type of image sensor, a luminance signal is generated mainly from the G signals and chroma signals are generated from the R, G, and B signals. It should be noted that the number of pixels and the type of color filter is not limited to those described above, and therefore other known numbers and filters may be used as appropriate.

Moreover, in a case in which the image sensor 106 is configured as a CMOS process-compatible sensor (hereinafter "CMOS sensor") that is one type of amplified solid-state image sensor, it can have the following characteristics: Specifically, since MOS transistors in the area sensor part and the surrounding circuitry, such as an image sensor drive circuit, an A/D conversion circuit, and an image processing circuit, can be formed in the same manufacture step, the number of masks used and process steps involved can be substantially reduced compared to a CCD, which is an advantage. In addition, a CMOS sensor also has the distinction of enabling random access to any pixel, which facilitates reduced resolution output for display and makes possible display on the display unit 107 at a high display rate and in real time.

The signals read out from the image sensor 106, after being subjected to certain processes that are described later, are displayed on the display unit 107 as image data. The display unit 107 is mounted on the rear surface of the camera body 101 and a user can directly observe the display on the display unit 107.

The image sensor 106, utilizing the advantages and distinctive features described above, can carry out both a display image output operation (output of only a decimated part of a light-receiving area of the image sensor 106) and a high precision image output operation (output from the entire light-receiving area). In addition, the image sensor 106 can also carry out focus control by a contrast detection method using the output of the image sensor 106.

Reference numeral 111 designates a movable half-mirror, which reflects a portion of the light rays from the photographing optical system 103 and allows the rest to pass through, thus splitting one optical path into two optical paths. Reference numeral 105 designates a focusing screen, provided on a planned image forming plane of an image of an object formed by the photographing optical system 103, and 112 designates a pentaprism. Reference numeral 109 designates a viewfinder lens for viewing the image of the object formed on the focusing screen 105, and is usually composed of multiple lenses. The focusing screen 105, the pentaprism 112, and the viewfinder lens 109 constitute a viewfinder optical system. Reference numeral 180 designates an optical viewfinder-internal information display unit for displaying certain types of information on the focusing screen 105.

Behind (that is, on an image plane side of) the half-mirror 111 is a movable sub-mirror 122, which reflects those of the light rays passing through the half-mirror 111 nearest an optical axis L1 and directs the light rays thus reflected to a focus detection unit 121. The sub-mirror 122 is coupled to the half-mirror 111 by a drive mechanism that is not shown, and is capable of being withdrawn from the photographing optical path. More specifically, the half-mirror 111 and the sub-mirror 122, which are movable, can be selectively positioned at either the position shown in FIG. 1 in the OVF mode (a first position) or the position shown in FIG. 2 in the EVF mode (a second position).

The focus detection unit 121 receives light rays from the sub-mirror 122 and carries out focus state detection using a phase difference detection method.

Reference numeral 108 designates a movable flash unit 108, and can move between a closed position, where the flash unit 108 is withdrawn into the camera body 101, and a flash position, where the flash unit 108 projects from the camera body 101. Reference numeral 113 designates a focal-plane shutter that controls the amount of light entering the image plane, and has a front curtain and a rear curtain, each composed of a plurality of shutter blades. Reference numeral 119 designates a main switch for activating the camera body 101.

Reference numeral 120 designates a release button that is pressed in two stages. When pressed halfway (switch SW1 ON), photography preparation is started (photometry, focus control, and so forth). Further, when pressed fully (switch SW2 ON), photographing operation is started (the focal plane shutter 113 is moved, the image sensor 106 is exposed, electrical charge signals are read out from the image sensor 106, the electrical charge signals are processed and image data is recorded onto a recording medium, and so forth).

Reference numeral 123 designates a viewfinder mode toggle switch. Each time the viewfinder mode toggle switch 123 is pressed, the object image viewing mode can be switched between the OVF and the EVF modes. Reference numeral 124 designates a menu display switch. Each time the menu display switch is pressed, display can be switched between menu display and a state of display prior to the menu display. It should be noted that one can switch to the OVF mode and to the EVF mode from the menu screen.

FIG. 3 is a block diagram showing schematically a functional configuration of the digital color camera shown in FIG. 1 and FIG. 2. It should be noted that identical reference numerals are assigned to those elements that are the same as those shown in FIG. 1 and FIG. 2, and consequently descriptions thereof are omitted.

First, a description is given of parts related to sensing and recording an image of an object.

The camera system of the present embodiment includes an image sensing system, an image processing system, a recording/playback system, and a control system. The image sensing system includes the photographing optical system 103 and the image sensor 106. The image processing system includes an A/D converter 130, an RGB image processing circuit 131, and a YC processing circuit 132. The recording/playback system includes a recording processing circuit 133 and a playback processing circuit 134. The control system includes a camera system control circuit 135, an operation detection circuit 136, an image sensor drive circuit 137, an AF control circuit 140, and a lens system control circuit 141.

Reference numeral 138 is a standardized connection terminal, connected to an external computer or storage medium and configured to transmit and receive data. The electrical circuits described above are supplied with power from a compact battery, not shown, and driven.

The image sensing system is an optical processing system that focuses light from the object onto an image sensing plane of the image sensor 106 via the photographing optical system 103. By controlling driving of the aperture 104 provided inside the lens device 102 and as necessary controlling driving of the focal-plane shutter 113, the correct amount of light of the light from the object can be received at the image sensor 106.

The signals read out from the image sensor 106 are supplied to the image processing system that includes the A/D converter 130. Image processing by the image processing system generates image data. The A/D converter 130 is a signal conversion circuit that, depending on the amplitude of the signals output from the pixels of the image sensor 106, converts, for example, the output signals of the image sensor 106, into, for example, 10-bit digital signals for output, with any image processing thereafter executed by digital processing. The image processing system is a signal processing circuit that obtains image signals of a desired format from R, G and B digital signals, and converts the R, G and B digital signals into YC signals and the like expressed as a luminance signal Y and color difference signals (R−Y), (B−Y).

The RGB image processing circuit 131 is a signal processing circuit that processes the output signals of the A/D converter 130, and includes a white balance circuit, a gamma correction circuit, and an interpolation circuit that enhances image resolution by interpolation.

The YC processing circuit 132 is a signal processing circuit that generates the luminance signal Y and the color difference signals R−Y, B−Y. The YC processing circuit 132 includes a high-frequency luminance signal generator circuit that generates a high-frequency luminance signal YH, a low-frequency luminance signal generator circuit that generates a low-frequency luminance signal YL, and a color difference signal generator circuit that generates the color difference signals R−Y, B−Y. The luminance signal Y is formed by combining the high-frequency luminance signal YH and the low-frequency luminance signal YL. It should be noted that the luminance signal Y and the color difference signals R−Y, B−Y (chroma signals) that are output from the YC processing circuit 132 are hereinafter collectively referred to as YC signals.

The record/playback system is a processing system that outputs image signals to a memory or an external computer or storage medium, not shown, and outputs image signals to the display unit 107. The recording processing circuit 133 writes image signal to and reads image signals from the memory or the external computer or storage medium, and the playback processing circuit 134 plays back the image signals that are read out from the memory or the external computer or storage medium and outputs them to the display unit 107. It should be noted that the image signals read out from the memory are not just photographed images but may also be images for display screens that are prepared in advance so as to enable the user to set various settings of the camera.

The recording processing circuit 133 has within it a compression/expansion circuit that compresses the YC signals that represent still image data and moving image data and are output from the YC processing circuit 132 using a predetermined compression format and also expands compressed data. The compression/expansion circuit has a frame memory or the like for signal processing, and accumulates YC signals from the YC processing circuit 132 in the frame memory at each frame, reads out the YC signals of the frames every several blocks, and compression-encodes them.

The playback processing circuit 134 is a circuit that converts the YC signals into a matrix and then into a signal suitable for the display unit 107, such as R, G and B signals. The signals that are converted by the playback processing circuit 134 are then output to the display unit 107 and displayed (played back) as visible images.

The operation detection circuit 136 in the control system detects the operation of the main switch 119, the release button 120, the viewfinder mode toggle switch 123, the menu display switch 124, and the like (other switches are not shown), and outputs detection results to the camera system control circuit 135. The camera system control circuit 135 receives a detection signal from the operation detection circuit 136 and controls the image sensing system, the image processing system, and the recording/playback system, respectively, according to the detection results. For example, when the switch SW2 is turned ON due to manipulation of the release button, the camera system control circuit 135 controls driving of the half-mirror 111 and the sub-mirror 122 and driving of the focal-plane shutter 113. Further, the camera system control circuit 135 also controls the operation of the AF control circuit 140 that processes the detection signals in a focus detection area obtained by the focus detection unit 121, driving of the image sensor 106, the operation of the RGB image processing circuit 131, and the compression processing of the recording processing circuit 133.

The camera system control circuit 135 generates a timing signal for carrying out the image sensing operation, and outputs the timing signal to the image sensor drive circuit 137. The image sensor drive circuit 137, by receiving control signals from the camera system control circuit 135, generates drive signals for driving the image sensor 106. An information display circuit 139 receives control signals from the camera system control circuit 135, and controls driving of the optical viewfinder-internal information display unit 180.

Next, a description is given of the internal structure of the lens device 102. The lens system control circuit 141 controls driving through the lens drive circuit 142, so as to move the photographing optical system 103 to an in-focus position. The lens system control circuit 141 carries out drive control of the aperture 104 through an aperture drive circuit 143, depending on the luminance of the object at the time of photography. The lens system control circuit 141 makes possible mutual communication with the camera system control circuit 135 inside the camera body 101 through a communication contact point 102a on the lens device 102 side and a communication contact point 101a on the camera body 101 side. The lens system control circuit 141 reports the type, focal length and the like of the lens device 102 to the camera system control circuit 135.

When the camera body 101 is in the OVF mode (the state shown in FIG. 1), the aperture 104 of the lens device 102 is open. The half-mirror 111 and the sub-mirror 122 are at the first position on the photographic optical path, and the front curtain and the rear curtain of the focal-plane shutter 113 are charged by a charging mechanism, not shown, composed of an electromagnetic motor and a gear train. Such charging closes the front curtain and opens the back curtain. Therefore, the image sensor 106 is not exposed. Light rays from the object entering from the photographing optical system 103 are reflected by the half-mirror 111 and directed to the viewfinder optical system, while those light rays that pass through the half-mirror 111 are reflected by the sub-mirror 122 and directed to the focus detection unit 121. Therefore, an image of the object that is formed by the foregoing light rays can be observed through the viewfinder lens 109 and at the same time the focus detection unit 121 can carry out focus detection (photography standby in the OVF mode). Normally, the digital color camera enters the OVF mode when the main switch is off and immediately after the main switch is turned on.

In the EVF mode shown in FIG. 2, the half-mirror 111 and the sub-mirror 122 are withdrawn from the photographic optical path in the second position, and light rays entering from the photographing optical system 103 are led directly to the image sensor 106. In this state, the image sensor 106 carries out continuous sensing of the image of the object, the electrical charges obtained from the image sensor 106 are reduced in resolution and output for display, and the image is continuously displayed on the display unit 107, achieving real-time display that enables the photographer to decide on the composition of a shot while checking the image of the object displayed on the display unit 107. In the EVF mode, focus detection based on the contrast detection method that uses the output of the image sensor 106 can be carried out, without using the focus detection unit 121 (photography standby in the EVF mode).

Next, a description is given of operation in the present embodiment of the camera system having the configuration described above, while referring to FIGS. 4 through 8.

Figure 4:
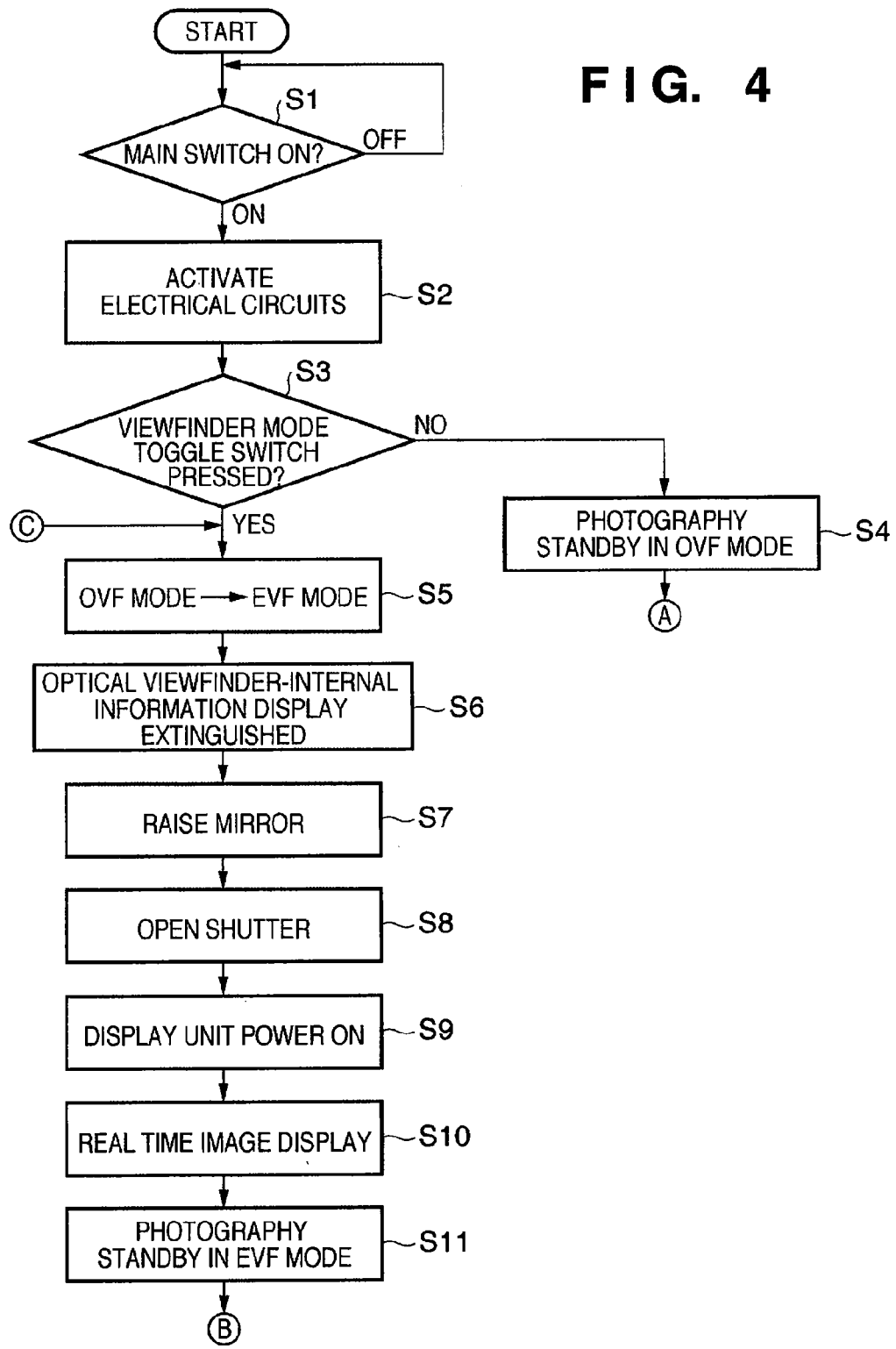
FIG. 4 is a flow chart illustrating operation of a camera system according to the embodiment of the present invention.

First, with reference to the flow chart shown in FIG. 4, a description is given of establishing the viewfinder mode after the camera has been turned on by turning on the main switch 119.

In step S1, when it is detected that the main switch 119 has been switched on, in step S2 the electrical circuits of the camera are activated. Then, in step S3, pressing of the viewfinder mode toggle switch 123 is monitored, and, if not pressed, it is determined that the camera is in the OVF mode and processing proceeds to step S4, where the camera is put into photography standby in the above-described OVF mode and processing proceeds to the processing shown in FIG. 5.

By contrast, if in step S3 pressing of the viewfinder mode toggle switch 123 is detected, then in step S5 the camera starts to switch from the OVF mode to the EVF mode. First, in step S6, driving of the information display circuit 139 is controlled so that the optical viewfinder-internal information display unit 180 does not display information in the field of view of the viewfinder. Thus, in accordance with the user's selection of the EVF mode, driving of the optical viewfinder-internal information display unit 180 is stopped, thereby enabling unnecessary electrical power consumption inside the camera system to be reduced or eliminated, and wear on the battery to be similarly reduced if not eliminated.

In step S7, the camera system control circuit 135 drives a motor, not shown, to rotate the half-mirror 111 and the sub-mirror 122 to a top of a mirror box (the second position), so as to withdraw the half-mirror 111 and the sub-mirror 122 from the photographic optical path (the state shown in FIG. 2). Then, in step S8, only the front curtain of the focal-plane shutter 113 is opened, thereby shifting the camera to a "bulb" state. By so doing, light from the object that has passed through the photographing optical system 103 continuously reaches the image sensor 106 so as to put the camera into an image sensing-enabled state for displaying the image on the display unit 107.

Further, power to the display unit 107 is turned on (step S9). Then, sensing of the image of the object formed by the photographing optical system 103 is carried out continuously by the image sensor 106, and the image data that is output from the image sensor 106 and processed is displayed on the display unit 107 in real time (step S10), thus putting the camera into photography standby in the EVF mode (step S11), after which processing proceeds to the processing shown in FIG. 6. The processing up to this point completes the operation of switching from the OVF mode to the EVF mode.

Figure 5:
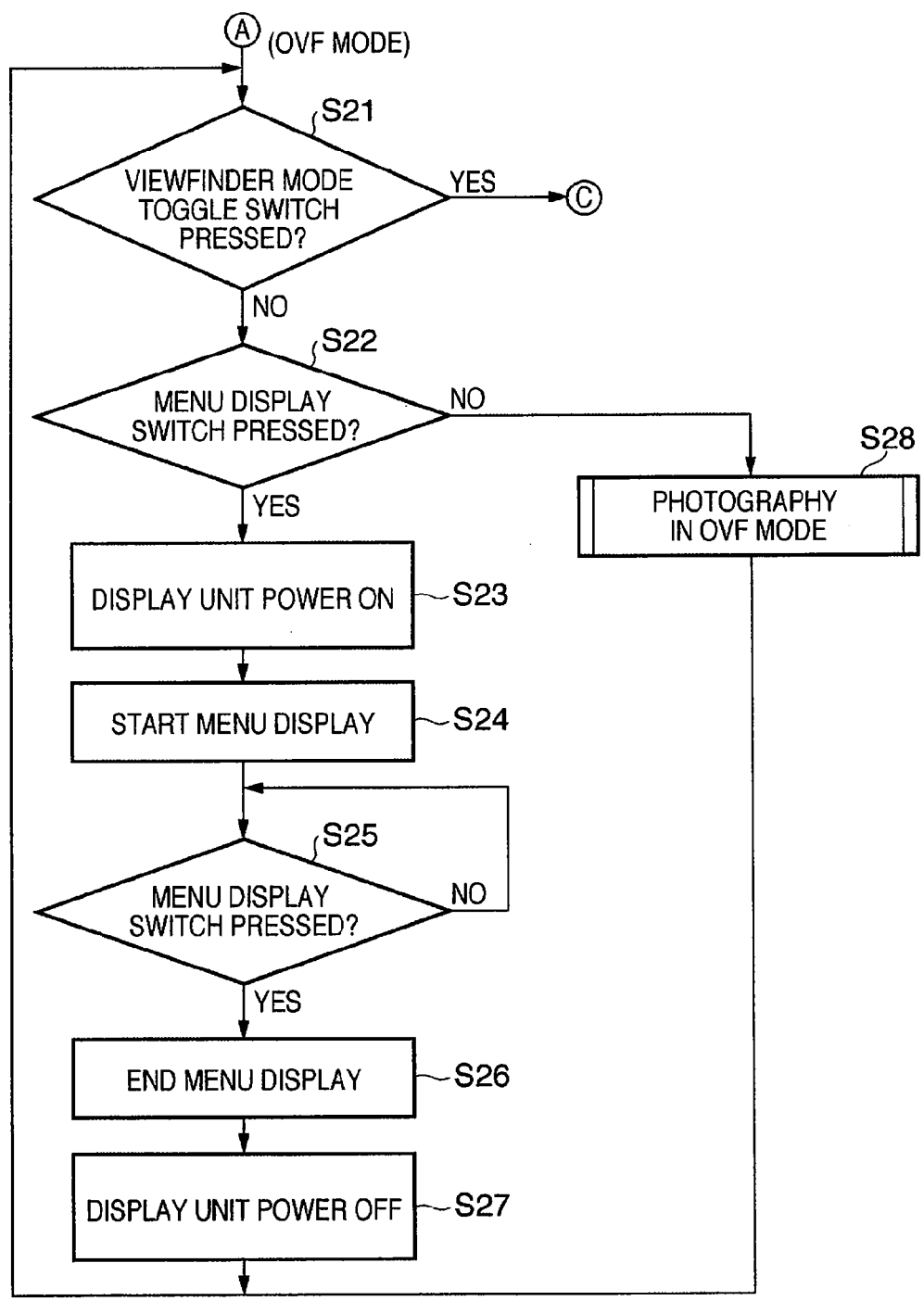
FIG. 5 is a flow chart illustrating switch reception operations during photographing standby state in an OVF mode according to the embodiment of the present invention.

Next, a description is given of receiving input from the switches while in standby for photography in the OVF mode using the flow chart shown in FIG. 5.

Even after entering photography standby in the OVF mode, the camera continues to monitor for pressing of the viewfinder mode toggle switch 123 (step S21) and at the same time monitors for pressing of the menu display switch 124 (step S22). In step S21, when pressing of the viewfinder mode toggle switch 123 is detected, processing proceeds to step S5 shown in FIG. 4 and the switch described above from the OVF mode to the EVF mode is carried out.

In addition, in step S22, when pressing of the menu display switch 124 is detected, in step S23 the power to the display unit 107 is turned on, and in step S24 a menu screen previously prepared in a memory, not shown, is displayed.

In step S25 the camera monitors for another pressing of the menu display switch 124, and as long as the menu display switch 124 is not again pressed continues to display the menu screen on the display unit 107. It should be noted that, unlike menu screen display in the EVF mode to be described later, when displaying the menu screen in the OVF mode the half-mirror 111 and the sub-mirror 122 are inside the photographic optical path and at the same time the focal-plane shutter 113 is closed. Therefore, in this state, the image sensor 106 is shielded. As a result, even if, for example, the photographing optical system 103 is inadvertently pointed toward the sun for an extended period of time, because the image sensor 106 is shielded, there is no concern that an accident will occur in which, for example, a portion of the image sensor 106 is burnt out by the sun.

In step S25, when another pressing of the menu display switch 124 is detected, display of the menu screen is ended (step S26) and power to the display unit 107 is turned off (step S27). Then, once again, the camera returns to photography standby in the OVF mode.

On the other hand, when neither the viewfinder mode toggle switch 123 nor the menu display switch 124 is pressed (NO at both steps S21 and S22), in step S28 photography is carried out in the OVF mode. The photographic operation carried out in step S28 is described later with reference to FIG. 7.

Figure 6:
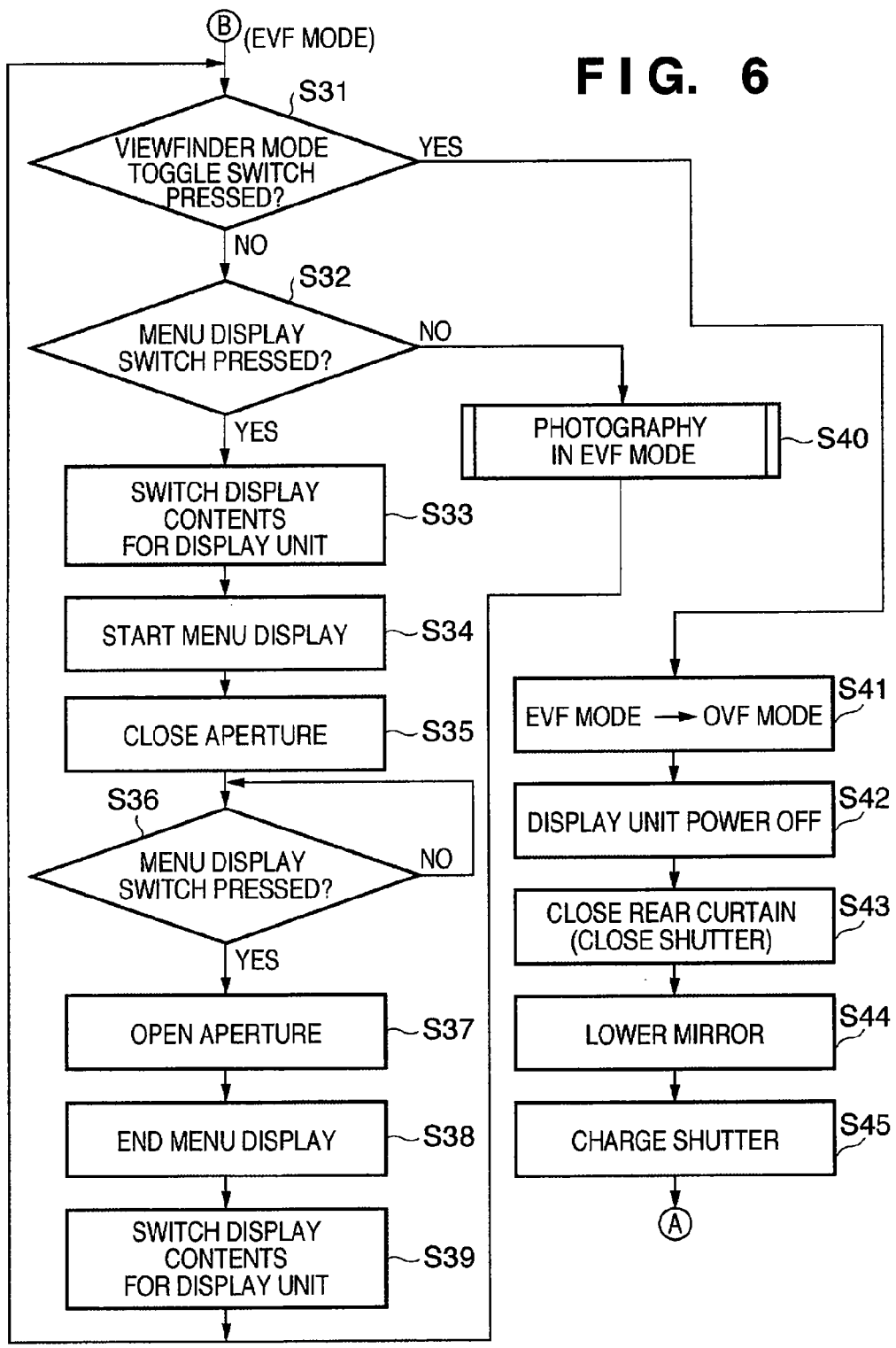
FIG. 6 is a flow chart illustrating switch reception operations during photographing standby state in an EVF mode according to the embodiment of the present invention.

Next, a description is given of receiving input from the switches while in standby for photography in the EVF mode, using the flow chart shown in FIG. 6.

Even after entering photography standby in the EVF mode, as when in the OVF mode the camera continues to monitor for pressing of the viewfinder mode toggle switch 123 (step S31) and at the same time monitors for pressing of the menu display switch 124 as well (step S32). In step S31, when pressing of the viewfinder mode toggle switch 123 is detected, processing proceeds to step S41 and a switch from the EVF mode to the OVF mode is carried out. This switching operation is described later.

When in step S32 pressing of the menu display switch 124 is detected, in step S33 the display contents of the display unit 107 switch from real-time display of the image of the object to the menu screen. Then, in step S34, the camera starts to display the menu screen previously prepared in the memory. Thereafter, in step S35, the camera closes (stops down) the aperture 104 inside the lens device 102.

As described above, when displaying the menu screen in the EVF mode, the half-mirror 111 and the sub-mirror 122 are withdrawn outside the photographic optical path, and further, the focal-plane shutter 113 is in a bulb (shutter-open) state in which opening of only the front curtain is finished, in which state the image sensor 106 is exposed. As a result, in the EVF mode, if, for example, the photographing lens is pointed toward the sun for an extended period of time, sunlight is focused on the image sensor 106 and there is a risk that a portion of the image sensor 106 might be burned out. In order to prevent such an accident from occurring, the aperture 104 is closed, thus shielding the image sensor 106.

In step S36, another pressing of the menu display switch 124 is monitored, and the camera continues to display the menu screen on the display unit 107 as long as the menu display switch 124 is not pressed.

When in step S36 another pressing of the menu display switch 124 is detected, processing proceeds to step S37, the aperture 104 is opened, and preparation is made for continuous image sensing by the image sensor 106 for the EVF. Further, in step S38 display of the menu screen is ended, and in step S39 the display contents of the display unit 107 are switched to real-time display of the image of the object. Then, once again, the camera returns to photography standby in the EVF mode.

Thus, as described above, by putting the half-mirror 111 at the second position and keeping the focal-plane shutter 113 open, and in that state shielding the image sensor 106 with the aperture 104, display can be returned quickly from display of the menu screen to display of the image of the object. Moreover, there is no mechanical noise generated by the driving of the half-mirror 111 and the sub-mirror 122, making it possible to prevent the user from mistakenly thinking that the shutter has been operated.

On the other hand, when neither the viewfinder mode toggle switch 123 nor the menu display switch 124 is pressed (NO at both steps S31 and S32), in step S40 photography is carried out in the EVF mode. The photographic operation carried out in step S40 is described later with reference to FIG. 8.

In addition, when in step S31 pressing of the viewfinder mode toggle switch 123 is detected, processing proceeds to step S41 and a switch from the EVF mode to the OVF mode is carried out. After switching is completed, in step S42 the power to the display unit 107 is turned off. Further, in step S43 the rear curtain of the focal-plane shutter 113 is closed and the shutter 113 is closed, and in step S44 the half-mirror 111 and the sub-mirror 122 are disposed aslant the photographic optical path (the first position). Subsequently, in step S45, the focal-plane shutter 113 is charged and driven, in preparation for subsequent photographing or for a switch to the EVF mode. By so doing, the camera is put into photography standby in the OVF mode, and processing proceeds to the processing shown in FIG. 5 and described above.

Figure 7:
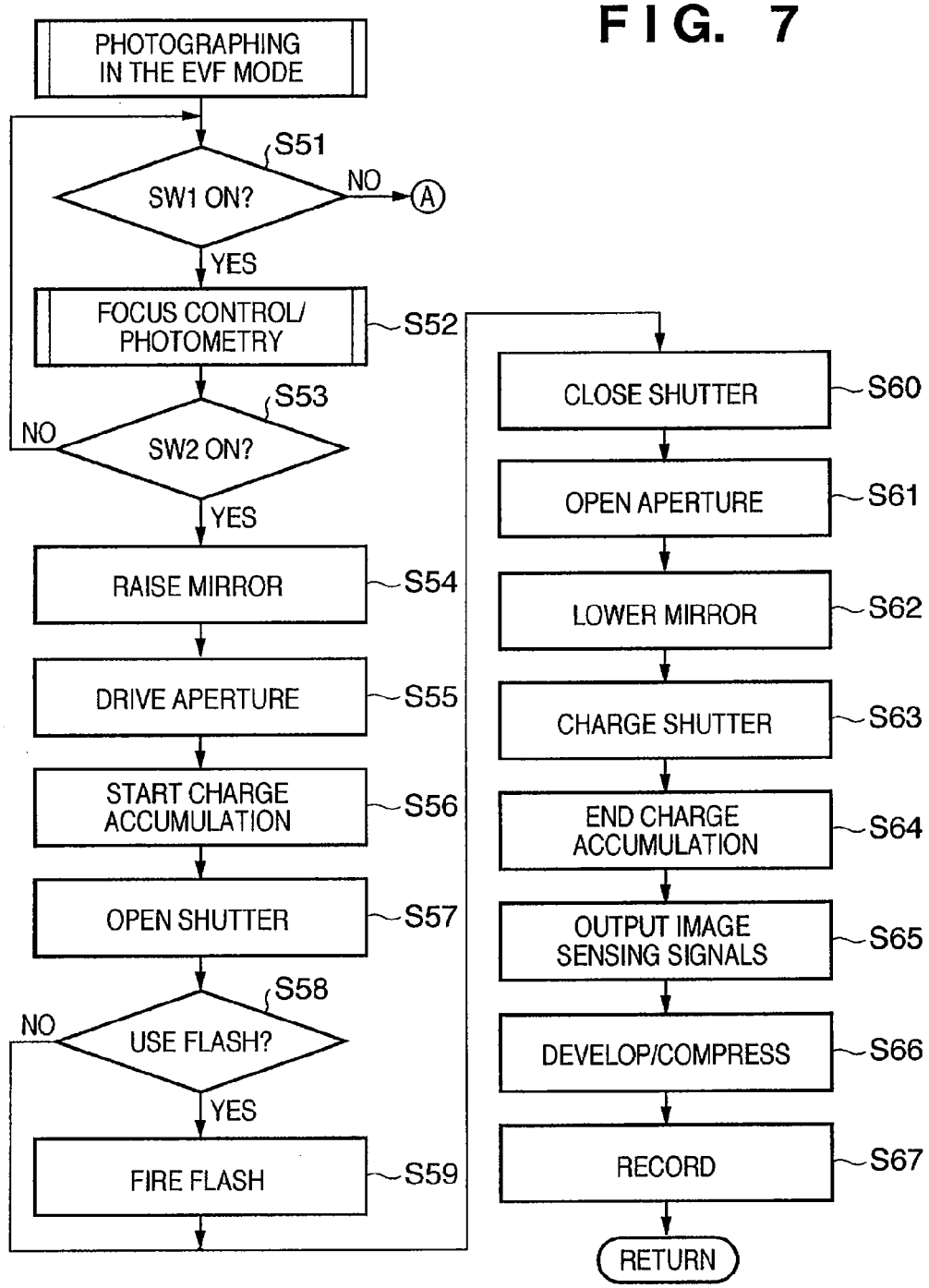
FIG. 7 is a flow chart illustrating operation in an OVF mode of the camera system according to the embodiment of the present invention.

Next, a description is given of photography in the OVF mode that is carried out in step S28 shown in FIG. 5, with reference to FIG. 7.

In step S51, it is determined whether or not switch SW1 has been turned on by operation of the release button 120. If SW1 is on, processing proceeds to step S52. If SW1 is off, processing returns to step S21 in FIG. 5 and the state of the viewfinder mode toggle switch 123 is monitored.

In step S52, photometry is carried out and the camera system control circuit 135 sets the exposure value (the aperture value and the exposure time) based on the results of that photometry. In addition, based on the detection results provided by the focus detection unit 121 the camera system control circuit 135 carries out focus control by driving the focus lens to the in-focus position.

Next, in step S53, it is determined whether or not switch SW2 is on. If SW2 is off, processing returns to step S51. If SW2 is on, processing proceeds to step S54.

In step S54, the camera system control circuit 135 drives a motor, not shown, and rotates the half-mirror 111 and the sub-mirror 122 together to withdraw them from the photographic optical path (the second position).

In step S55, information relating to the aperture value obtained in step S52 is transmitted from the camera system control circuit 135 to the lens system control circuit 141.

Upon receiving the information relating to the aperture value obtained in step S52, the lens system control circuit 141 controls the driving of the aperture 104 provided inside the lens device 102 so that the aperture diameter matches the aperture value.

In step S56, the camera system control circuit 135, after clearing the image sensor 106 electrical charges, starts charge accumulation in the image sensor 106. In step S57, the camera system control circuit 135 opens the front curtain of the focal-plane shutter 113 and opens the shutter, starting exposure of the image sensor 106.

In step S58, based on the photometry results the camera system control circuit 135 determines whether or not to fire the flash unit 108. At this point, if the camera system control circuit 135 determines that it is necessary to fire the flash unit 108, processing proceeds to step S59 and the camera system control circuit 135 controls the driving of the flash unit 108 to illuminate the object. If the camera system control circuit 135 determines that it is not necessary to fire the flash unit 108, processing proceeds to step S60.

In step S60, after the exposure time obtained in step S52 has elapsed, the camera system control circuit 135 closes the rear curtain of the focal-plane shutter 113 to close the shutter, ending exposure of the image sensor 106.

In step S61, the camera system control circuit 135 instructs the lens system control circuit 141 to drive the aperture 104 to an open value, which causes the lens system control circuit 141 to drive the aperture to the open value. In step S62, the camera system control circuit 135 drives a motor, not shown, and places the half-mirror 111 and the sub-mirror 122 aslant the photographic optical path (the first position). The half-mirror 111 returns from its position withdrawn from the photographic optical path to its position prior to photographing, that is, in the photographic optical path and directing light to the viewfinder, while at the same time the sub-mirror 122, which is coupled to the half-mirror 111, also moves to its original position inside the photographic optical path so as to direct light to the focus detection unit 121. Further, in step S63 the focal-plane shutter 113 is charged, in preparation for the subsequent operation, whether photographing or switching to the EVF mode. Thus is the camera put into photography standby in the OVF mode.

In step S64, passage of a set charge accumulation period is confirmed and a process of accumulating charges at the image sensor 106 is ended.

In step S65, accumulated electrical charge signals are read out from the image sensor 106 and the signals thus output are processed by the A/D converter 130, the RGB image processing circuit 131, the YC processing circuit 132, and the recording processing circuit 133. Then, photographed image data generated by the foregoing processing is written into a predetermined area of memory.

In step S66, the camera system control circuit 135, using the recording/playback system and as necessary the information processing system, reads out the photographed image data written to the predetermined area of the memory. Further, using calculation results stored in an internal memory, camera system control circuit 135 controls to carry out various types of development processing, including white balance, gamma correction, and color conversion. Further still, image compression according to a set picture quality (raw/fine/normal, etc.) is carried out using the compression/expansion circuit inside the recording processing circuit 133, and the compressed image data is written to an empty portion of an image storage buffer area of the memory.

In step S67, with the execution of one complete set of photographic operations, the camera system control circuit 135 carries out a recording process. In the recording process, image data stored in the image storage buffer area of the memory is read out and then written to a memory card or a compact flash card (registered trademark) through an interface or a connector, not shown. Image data is recorded each time such photographed and processed image data is written to the empty image portion of the image storage buffer area of the memory. After recording is finished, processing returns to step S21 shown in FIG. 5.

Figure 8:
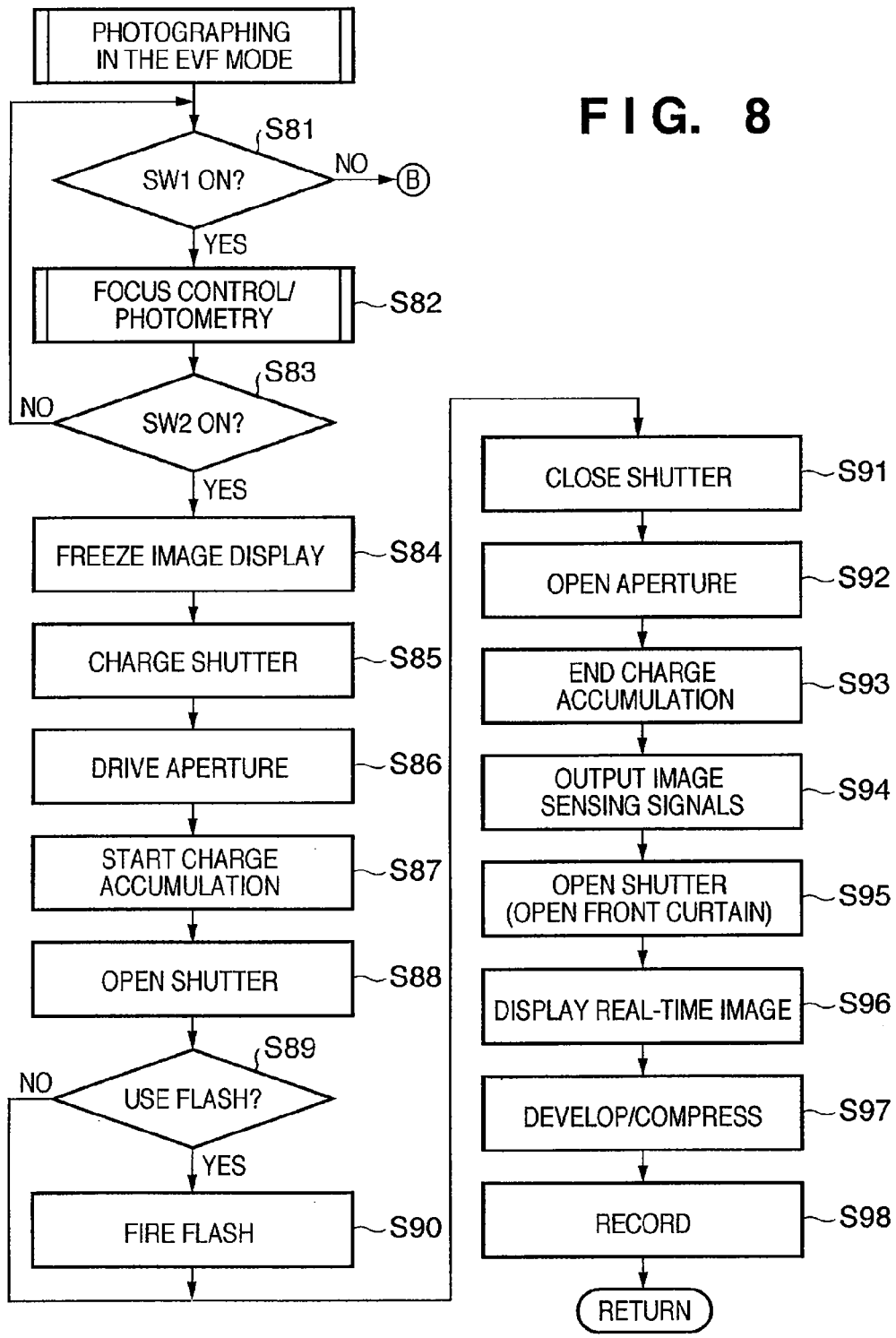
FIG. 8 is a flow chart illustrating operation in an EVF mode of the camera system according to the embodiment of the present invention.

Next, a description is given of photography in the EVF mode that is carried out in step S40 shown in FIG. 5, with reference to FIG. 8.

In step S81, it is determined whether or not switch SW1 is on. If switch SW1 is on, processing proceeds to step S82. If SW1 is off, processing returns to step S31 shown in FIG. 6 and the state of the viewfinder mode toggle switch 123 is monitored.

In step S82, photometry is carried out and the camera system control circuit 135 sets the exposure value (the aperture value and the exposure time) based on the results of that photometry. In addition, based on contrast information obtained from the EVF image by the contrast detection method, the camera system control circuit 135 carries out focus control by driving the focus lens of the photographing optical system 103 to a position at which the contrast is greatest.

In step S83, it is determined whether or not switch SW2 is on. If switch SW2 is off, processing returns to step S81 and the process described above is repeated. Specifically, the image of the object continues to be displayed in real time on the display unit 107 until SW2 turns on. By contrast, if SW2 is on, processing proceeds to step S84.

In step S84, the image sensor 106 clears the image sensor 106 electrical charges as well as pauses image sensing, and displays the last image output from the image sensor 106 on the display unit 107 (freeze image display).

In step S85, the rear curtain of the focal-plane shutter 113 is closed to close the shutter, and further, a drive mechanism that drives both the front curtain and the rear curtain of the focal-plane shutter 113 is charged by a shutter charge mechanism, not shown, in preparation for photographing. At this point, the front curtain of the focal-plane shutter 113, which has opened the shutter opening, is charged by the shutter charge mechanism composed of an electromagnetic motor and a gear train, not shown, and the shutter opening is closed.

In step S86, information relating to the aperture value obtained in step S52 is transmitted from the camera system control circuit 135 to the lens system control circuit 141. Upon receiving the information relating to the aperture value obtained in step S52, the lens system control circuit 141 controls the driving of the aperture 104 provided inside the lens device 102 so that the aperture diameter matches the aperture value.

In step S87, the camera system control circuit 135, after clearing the image sensor 106 electrical charges, starts charge accumulation in the image sensor 106. In step S88, the camera system control circuit 135 opens the front curtain of the focal-plane shutter 113 and opens the shutter, starting exposure of the image sensor 106.

In step S89, based on the photometry results the camera system control circuit 135 determines whether or not to fire the flash unit 108. At this point, if the camera system control circuit 135 determines that it is necessary to fire the flash unit 108, processing proceeds to step S90 and the camera system control circuit 135 controls the driving of the flash unit 108 to illuminate the object. If the camera system control circuit 135 determines that it is not necessary to fire the flash unit 108, processing proceeds to step S91.

In step S91, after the exposure time obtained in step S52 has elapsed, the camera system control circuit 135 closes the rear curtain of the focal-plane shutter 113 and closes the shutter, ending exposure of the image sensor 106.

In step S92, the camera system control circuit 135 instructs the lens system control circuit 141 to drive the aperture 104 to an open value, which causes the lens system control circuit 141 to drive the aperture to the open value. In step S93, passage of a set charge accumulation period is confirmed and a process of accumulating charges at the image sensor 106 is completed.

In step S94, accumulated electrical charge signals are read out from the image sensor 106 and the signals thus output are processed by the A/D converter 130, the RGB image processing circuit 131, the YC processing circuit 132, and the recording processing circuit 133. Then, photographed image data generated by the foregoing processing is written into a predetermined area of memory.

In step S95, after the front curtain and the rear curtain of the focal-plane shutter 113 are charged once by being driven by the shutter charge mechanism, only the front curtain is opened to put the focal-plane shutter 113 in a bulb state and continuously direct light from the image to the image sensor 106, thus making possible image sensing for real-time display of an image on the display unit 107.

In step 96, real-time display on the display unit 107 is resumed, which enables the photographer to decide on the composition of a shot while checking the image of the object displayed on the display unit 107.

In step S97, the camera system control circuit 135 reads out the photographed image data written to the predetermined area of the memory, and using calculation results stored in an internal memory, controls to carry out various types of development processing, including white balance, gamma correction, and color conversion. Further, image compression according to a set picture quality (raw/fine/normal, etc.) is carried out using the compression/expansion circuit inside the recording processing circuit 133, and the compressed image data is written to an empty portion of an image storage buffer area of the memory.

In step S98, with the execution of one complete set of photographic operations, the camera system control circuit 135 carries out a recording process. In the recording process, image data stored in the image storage buffer area of the memory is read out and then written to a memory card or a compact flash card (registered trademark) through an interface or a connector, not shown. Image data is recorded each time such photographed and processed image data is written to the empty image portion of the image storage buffer area of the memory. After recording is finished, processing returns to step S31 shown in FIG. 6.

It should be noted that although in the above-described embodiment a description is given of an example in which a menu screen previously prepared in the memory is displayed, any image other than the image of the object may be displayed.

In addition, instead of closing the aperture 104 immediately when displaying the menu screen, alternatively the aperture may be closed when the menu display switch 124 is not again pressed within a predetermined period of time after being once pressed.

According to the embodiment described above, when observing an image in the EVF mode and an image other than an image of the object is displayed, such as a menu screen or the like, only the aperture inside the lens barrel is stopped down. Such control, because it does not involve changing the position of the half-mirror or closing the shutter, makes it possible to switch promptly from an object image screen to a menu screen quietly without the sound of the shutter operating. Further, even when the photographing lens is inadvertently left pointing toward the sun for an extended period of time, focusing of sunlight on the image sensor and consequent burning out of a portion of the image sensor can be prevented because the closed aperture blocks the sunlight at a non-focus position. In addition, the time required to return once again to a screen displaying an image of the object from display of the menu screen is shortened, and therefore does not inconvenience the user.

It should be noted that the present invention is not limited to the description given in the above-described embodiment of a single-lens reflex camera. Rather, the present invention is applicable to any camera that has an aperture and can execute EVF.

Moreover, although in the above-described embodiment a description is given of switching from a real-time image to a menu screen when displaying the menu screen in the EVF mode, the present invention is also applicable to in a case in which the menu screen is superimposed and displayed on the real-time image. In that case also, by stopping down the aperture as much as possible, the real-time image is not displayed, or, since only a dark real-time image is displayed, the menu screen can be seen easily.

As can be appreciated by those skilled in the art, the present invention is also applicable when the camera is set to a playback mode to play back and display on a display unit image data recorded on a recording medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-137016, filed on May 23, 2007, which is hereby incorporated by reference herein in its entirety.

What is claimed is:

1. An image sensing apparatus to which a detachable lens unit is attached, having:
    an image sensor adapted to convert light entering through the attached lens unit into electrical signals; and
    a display unit,
    the image sensing apparatus having an electronic viewfinder mode in which an image based on electrical signals obtained by the image sensor is displayed continuously on the display unit, wherein the image sensing apparatus further comprises:
    a control unit operable to cause an aperture unit included in the attached lens unit to stop down if there is an instruction to display an image other than an image based on electrical signals obtained by the image sensor on the display unit while in the electronic viewfinder mode.

2. The image sensing apparatus according to claim 1, further comprising:
    an optical viewfinder; and
    a movable mirror, movable between a first position on a photographic optical path where the movable mirror directs light entering through the attached lens unit to the optical viewfinder, and a second position off the photographic optical path so that the light falls on the image sensor,
    wherein, in the electronic viewfinder mode, the movable mirror is moved to the second position and the control unit is operable to hold the movable mirror at the second position and cause the aperture unit to stop down if there is an instruction to display an image other than an image based on electrical signals obtained by the image sensor.

3. The image sensing apparatus according to claim 1, further comprising a shutter unit that shields the image sensor, wherein the shutter unit is open in the electronic viewfinder mode and if there is an instruction to display an image other than an image based on electrical signals obtained by the image sensor, the control unit is configured to keep the shutter open and to cause the aperture unit to stop down.

4. The image sensing apparatus according to claim 1, wherein the control unit is configured to cause the aperture unit to stop down if there is no instruction to resume display of an image based on electrical signals obtained by the image sensor for a predetermined period of time after there is an instruction to display an image other than an image based on electrical signals from the image sensor.

5. The image sensing apparatus according to claim 1, wherein an image other than an image based on electrical signals obtained by the image sensor is a menu screen.

6. The image sensing apparatus according to claim 1, wherein an instruction to display an image other than an image based on electrical signals obtained by the image sensor is the selection of a playback mode.

7. A control method for an image sensing apparatus, to which a detachable lens unit is attached, that includes an image sensor that converts light entering through the attached lens unit into electrical signals, and a display unit, and that is operable in an electronic viewfinder mode in which an image based on electrical signals obtained by the image sensor is displayed continuously on the display unit, the control method being comprising:

stopping down an aperture unit included in the attached lens unit if there is an instruction to display on the display unit an image other than an image based on electrical signals obtained by the image sensor while in the electronic viewfinder mode.

8. A camera system comprised of a lens unit and an image sensing apparatus to which the lens unit can be attached, wherein the lens unit comprises an aperture unit, and the image sensing apparatus comprises:

an image sensor adapted to convert light entering through the lens unit into electrical signals; and a display unit, wherein the image sensing apparatus having an electronic viewfinder mode in which an image based on electrical signals obtained by the image sensor is displayed continuously on the display unit, wherein the image sensing apparatus further comprises:

a control unit operable to cause the aperture unit to stop down if there is an instruction to display an image other than an image based on electrical signals obtained by the image sensor on the display unit while in the electronic viewfinder mode.

* * * * *